United States Patent Office 3,491,016
Patented Jan. 20, 1970

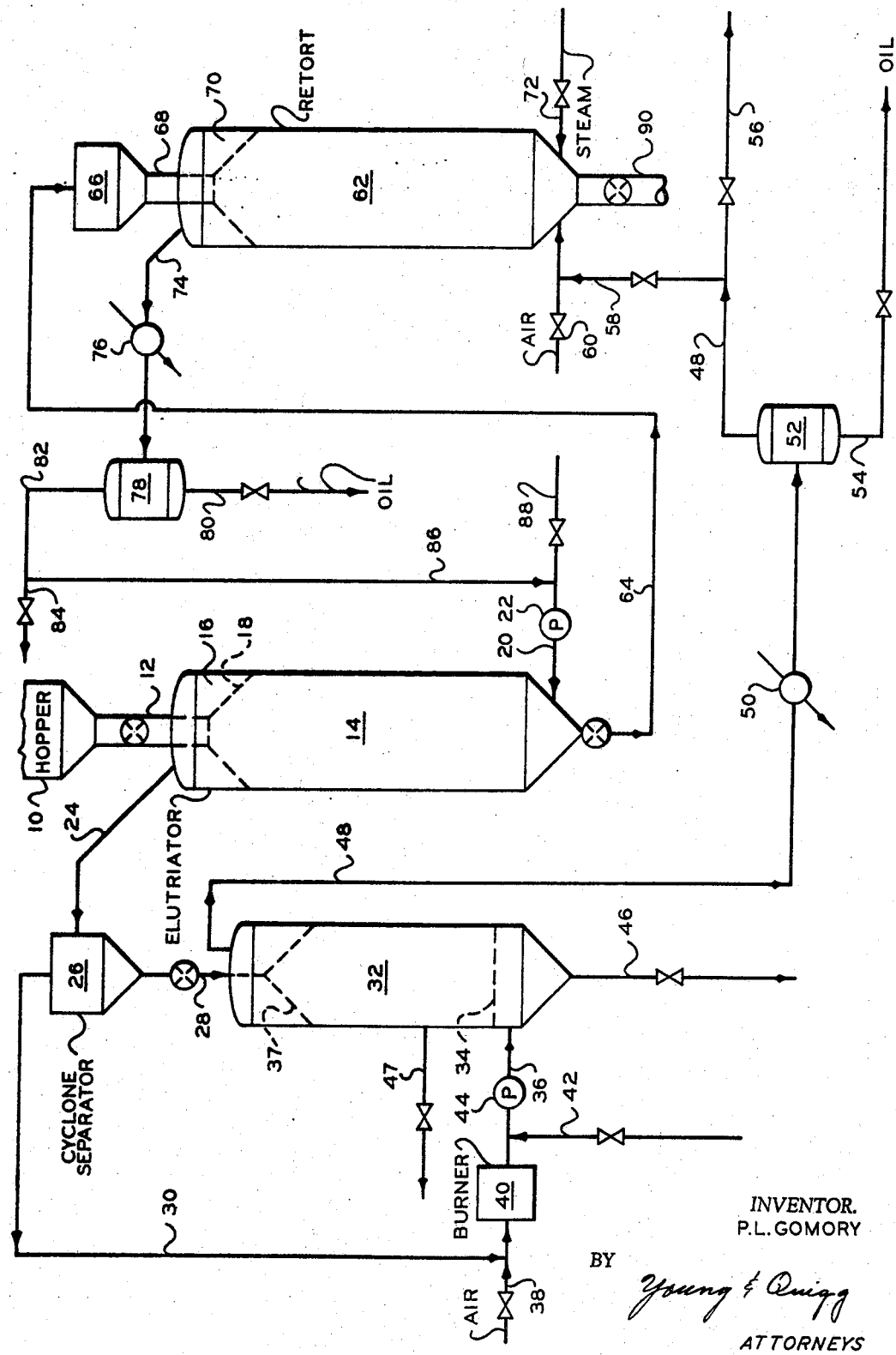

3,491,016
PROCESS FOR TREATING CRUSHED
OIL SHALE
Paul L. Gomory, Washington, D.C., assignor to Phillips
Petroleum Company, a corporation of Delaware
Filed July 18, 1967, Ser. No. 654,228
Int. Cl. C10g 1/00; C10b 53/06, 1/04
U.S. Cl. 208—11                                    3 Claims

ABSTRACT OF THE DISCLOSURE

Crushed oil shale containing fines is gravitated thru an elutriator in contact with an ascending stream of elutriating gas to remove said fines as a suspension in said gas, the fines are recovered from the resulting suspension and passed to a fluidized bed retorting step for recovery of oil therefrom with hot retorting gas, and the coarse shale is gravitated thru a retort in contact with an ascending hot retorting gas. Effluent gas from the coarse shale retort is cooled to condense and recover heavier oil and the remaining gas, containing light oil vapor, is used as elutriating gas, the off-gas from the elutriator being burned with air to supply retorting gas in the fluidized bed retorting step.

---

This invention relates to a process and apparatus for treating crushed oil shale to recover oil therefrom.

The abundance of oil shale containing substantial concentrations of recoverable oil is well known in the petroleum industry. Various processes have been devised and proposed for the recovery of oil from such oil shales, both in situ and in retorting plants above ground. In the retorting operation in plants above ground, the oil shale, after mining, is crushed to a particle size ranging from lumps of two or three inches maximum dimension down to fines smaller than about 200 mesh. The crushed oil shale is then gravitated as a moving bed thru a retort where it is contacted with an ascending stream of hot retorting gas, commonly formed by burning a portion of the oil in the shale in the lower section of the retorting zone.

One of the problems in this type of plant operation is the problem of fines, which have a tendency to plug the gravitating moving bed of coarse shale in the retort. A common expedient in a plant of this kind is to pass the crushed shale thru screens to remove the fines before passing the larger particles and lumps thru the retort. In a proposed plant for the recovery of shale oil, the fines removed by screening amount to about 2,000,000 tons/yr. This large amount of waste from the plant process must be disposed of to avoid piling up on the plant premises and to improve the economics of shale oil recovery.

The present invention is concerned with a process and apparatus arrangement for disposing of the major portion of the waste fines and simultaneously recovering the oil contained therein.

Accordingly, it is an object of the invention to provide a process and arrangement of apparatus for recovering fines from crushed oil shale and producing oil from the recovered fines. Another object is to provide a process and arrangement of apparatus for recovering fines from crushed oil shale and separately producing oil from the fines and from the coarser particles and lumps of oil shale using cooperative steps. A further object is to provide an efficient and economical process for the recovery of shale oil from crushed oil shale. Other objects of the invention will become apparent to one skilled in the art upon consideration of the accompanying disclosure.

In accordance with the broad aspect of the invention, oil-shale fines are recovered from crushed oil shale by elutriation in an elutriation zone by gravitating the crushed shale therethru in contact with a stream of elutriating gas, the entrained fines in the effluent elutriating gas are recovered in a gas-solids separator (such as a cyclone separator) and are passed into an upright fluidized bed retorting zone, utilizing a hot retorting and fluidizing gas to produce oil vapors from the shale fines. One embodiment of the invention comprises gravitating the resulting coarse oil shale thru an upright retorting zone in contact with a hot retorting gas, condensing a portion of the oil from the off-gas from the retorting zone, separating the condensed liquid oil from the uncondensed gas containing light oil vapors, passing the separated retorting gas containing light oil vapors thru the elutriation zone as at least a portion of the elutriating gas, and burning the light oil vapors in the off-gas from the elutriation zone to produce a hot-retorting gas which is then passed to the fluidized bed retorting zone to recover oil from the fines therein. Another feature of the invention comprises condensing a portion of the oil vapor in the off-gas from the fluidized bed retorting zone and passing at least a portion of the remaining gas containing light oil vapors in admixture with air to the gravitating bed retorting zone wherein the oil vapors are burned with air to produce hot retorting gas. Excess air is generally provided so as to burn a substantial portion of the shale oil from the shale in the lower section of the gravitating bed of oil shale. Excess air is usually injected into the burner producing hot combustion gas for the fluidized bed retorting so that a portion of the shale oil in the fluidized bed is burned to enhance the heating and retorting effect of the retorting gas. Steam or other hot gas may also be utilized to supplement the retorting gas in each of the retorting zones.

A more complete understanding of the invention may be had by reference to the accompanying schematic drawing which is a flow diagram of a preferred embodiment of the process and apparatus arrangement of the invention.

Referring to the drawing, crushed oil shale from crushing equipment, not shown, is fed from storage or hopper 10 via conduit 12 into an elutriator 14, conduit 12 extending into the elutriator a substantial distance to provide a vapor space 16 above shale bed 18. Elutriating gas is injected into the bottom of the elutriator from conduit 20 under the impetus of blower 22. The flow rate of the elutriating gas thru elutriator 14 is regulated to recover most of the fines from the crushed shale such as particles below a selected mesh size which may vary from 40 to 50 to about 100. The off-gas from the elutriator containing the suspension of fines is passed via line 24 into a gas-solids separator such as cyclone separator 26. The resulting dust-free gas is recovered overhead thru line 30 and the separated fines gravitate into line 28 and thence, into fluidized bed retort 32 containing a gas distributing plate 34 in its lower section below which retorting and fluidizing gas is injected from line 36. Thus, a fluidized bed of fines 37 is maintained in column 32, extending from plate 34 to the outlet of line 28.

When the elutriating gas ascending column 14 contains light hydrocarbon vapor in accordance with one embodiment of the invention, the off-gas in line 30 containing this hydrocarbon vapor is mixed with air from line 38 and passed to burner 40 where it is burned to supply heat for the retorting in fluidized bed retort 32. Usually, air in excess of the stoichiometric equivalent of the oil vapor in line 30 is admixed with the off-gas so as to provide excess oxygen for burning a portion of the shale oil in the fines in column 32 to provide additional retorting heat. Line 42 connects with line 36 upstream of blower 44 to supply auxiliary retorting gas such as steam or combustion gas from any suitable source. A vent line 46 is provided in the bottom of column 32 for removing any sediment or other materials collecting in the bottom of this column. Spent shale fines are withdrawn thru conduit 47 intermittently or continuously.

Effluent gas from column 32 resulting from the retorting in the fluidized bed, is recovered in line 48 in which are positioned the condenser 50 and a separator 52. The heavier oil vapors are condensed by cooling in condenser 50 and are separated from the uncondensed gases and vapors in separator 52, being recovered thru line 54 as shale-oil product. Any portion or all of the off-gas from separator 52 may be recovered thru line 56 for disposal in any suitable manner. However, it is preferred to pass this off-gas containing light oil vapors to line 60 for admixture with air for burning in oil-shale retort 62.

The oil-shale feed to retort 62 comes from transfer line 64 leading from the bottom of elutriator 14, and delivering into a hopper 66 from which conduit 68 extends into the retort a substantial distance to provide a vapor space 70 above the shale bed in the retort. The retort gas from line 60 comprising excess air and oil vapor from line 58 supplies heat and burns a portion of the shale oil in the oil shale gravitating thru retort 62. Steam or other hot retorting gas may also be supplied to the lower section of retort 62 via line 72.

The oil-rich effluent gas from retort 62 is recovered in line 74 containing a suitable condenser 76 and the cooled fluids are passed to a gas-liquid separator 78 from which the liquid oil is recovered thru line 80 and the uncondensed gas is recovered thru line 82. While any portion of the off-gas from separator 78 may be vented thru line 84, it is preferred to pass this gas containing uncondensed light oil vapors thru line 86 for introduction to elutriator 14 via line 20 under the impetus of blower 22. Additional elutriating gas may be introduced to line 20 from any suitable source via line 88. Spent shale from retort 62 is passed to disposal or further treatment thru conduit 90.

The conditions utilized in retorting the oil shale in either retort 62 or fluidized bed retort 32 are well known in the art. The retorting operation is generally conducted at a temperature in the range of about 750 to 1200° F. at any suitable pressure. U.S. Patent 3,297,562 discloses a suitable retorting apparatus and operating conditions for a gravitating continuous bed of oil shale. The apparatus disclosed may be utilized in lieu of retort 62 in the apparatus arrangement and process of the instant invention. However, other oil shale retorting devices known to the art may be utilized for this purpose. In any event, the lower section of retort 62 functions as a cooling section and the upper section functions as a shale preheating section by recovering heat from the hot gases from the intermediate retorting section. Sufficient combustion of fuel is effected in the bottom of the retorting section to supply the necessary heat for driving the oil out of the oil shale and all of this fuel may comprise the shale oil itself, but it is preferred to utilize the light oil vapor from line 58, admixed with excess air from line 60 to provide at least a portion of the retorting heat. Also, other hot retorting gas may be supplied thru line 72 including steam and/or combustion gas.

The invention, disclosed and illustrated, makes beneficial use of interrelated cooperative steps associated with the retorting in column 62, elutriation in column 14, and retorting in the fluidized bed in column 32. The elutriation in column 14 removes fines which tend to substantially obstuct the flow of retorting gas thru column 62 thereby enhancing the retorting step therein. The use of uncondensed light oil vapor, from the retorting of fines in column 32, in the retorting gas fed to column 62 enhances the retorting in column 62. Likewise, the use of effluent light oil vapor from retort 62 as elutriating gas in column 14 permits the use of off-gas from separator 26 as fuel in the fluidized bed retorting in column 32. Thus, the entire arrangement of apparatus and process steps facilitate the recovery of shale oil from crushed oil shale and make use of the elutriated fines which are a burden on the usual plant process.

Although the invention has been described with respect to elutriation involving gravitation, it is possible and within the scope of the invention to use other means for separating the fines from the crushed oil shale. One skilled in the art being possessed of the broad concepts of this invention can apply known techniques, indeed techniques yet unknown, to perform this separation step. Further, although the invention has been described to involve in a now preferred form thereof, the separation of the fines from the elutriating gas it is within the scope of the invention to pass at least a portion of the elutriating gas into the zone in which the fines are treated or retorted to recover hydrocarbon therefrom. Thus, when hydrocarbon gas and/or vapor is used as at least a portion of the elutriating fluid, it can be passed at least in part to the step in which the fines are beneficiated. Such a beneficiation step will ordinarily involve retorting and this retorting can be accomplished by heating the fines directly as by hot gases or combustion gases introduced into the treating zone and therein intermittently admingling with the fines or the retorting can be accomplished by indirect heating in apparatus somewhat similar to that of a coke oven. One skilled in the art in possession of this disclosure and having studied the same, can apply other techniques well within the scope of this disclosure to the beneficiation of the fines.

In a modified embodiment of the invention the fines with or without at least a portion of the gases or vapors employed to remove them from the coarser oil shale particles can be passed at least in part to certain places in the retort in which the coarse particles are being retorted to recover hydrocarbon therefrom. In Ser. No. 616,665 filed Feb. 16, 1967, there is disclosed and claimed a method and apparatus for retorting hydrocarbonaceous fines-containing material which comprises passing said material into a retort in which coarser material is being retorted to a preselected section in said retort at which said fines will be subjected, due to conditions of operation and their presence in said retort at said place, to optimum conditions for their beneficiation.

Depending upon conditions and as is well understood in the art, chemical conditioning of the elutriating gases or vapors and/or of the hydrocarbons being released from the oil shale either in the separate treatment of the fines to recover hydrocarbon therefrom or when these are treated together with the coarser particles, can be accomplished.

It is within the scope of the broad concepts of this invention to intermingle the fines with or without at least a portion of the elutriating medium with other materials undergoing conversion or beneficiation. For example, it is possible to admix the fines and any accompanying fluid or medium with crushed coal or other material undergoing a coking operation, e.g., a heavy oil which is being coked according to hydrocarbon oil coking methods now known.

When such or other operations are being practiced, it is within the scope of this invention to admix fines suspended in the elutriating medium with hot gases or vapors emanating from, say, a coking operation to cool the said gases and to a degree beneficiate said fines. Thereafter the fines which may have been to an extent beneficiated are recovered and beneficiated in the coking or other operation as in the retorting of the coarse oil shale particles.

One schooled in the art will appreciate that depending on conditions of temperature, time, and catalysts which may be introduced, a chemical conversion can take place between, say, the vapors resulting from the coking operation and whatever elutriating medium has been selected with such conversion in mind.

Coke resulting from an operation in which a hydrocarbon material and the fines have been treated together will in view of its inorganic content find use as fill, highway ballast, and as filler for asphalt.

I claim:
1. A process for treating oil shale to recover oil therefrom which comprises the steps of:
   (a) crushing said shale to a particle size ranging from dust to small lumps suitable for retorting in a gravitating bed;
   (b) gravitating the crushed shale of step (a) through an elutriating zone in contact with an ascending stream of gas so as to remove and entrain fines in the effluent gas;
   (c) passing the effluent gas from step (b) thru a separation zone to separately recover said fines and said gas;
   (d) passing fines recovered from step (c) into a fluidized bed retorting zone and there maintaining said fines in a fluidized bed with hot retorting gas for a substantial period so as to produce vaporized oil in the retorting gas;
   (e) separately recovering a mixed stream of retorting gas and vaporized oil, and residual fines from the fluidized bed of step (d);
   (f) gravitating the effluent shale from the lower end of the elutriating zone of step (b) thru a shale retorting zone in contact with an ascending stream of hot retorting gas so as to produce vaporized oil from said shale in the retorting gas;
   (g) recovering an effluent stream of oil vapor and retorting gas from step (f);
   (h) condensing a substantial portion of the oil vapors from said effluent stream in step (g) and separating therefrom a stream of remaining light oil vapor and retorting gas;
   (i) passing a substantial portion of the remaining light oil vapor and retorting gas of step (h) into the lower end of the elutriating zone of step (b) as a substantial portion of said ascending stream of gas;
   (j) passing the recovered stream of gas of step (c) in admixture with air into a burning zone to burn the oil vapor therein to produce a hot retorting gas;
   (k) passing the hot retorting gas of step (j) into the lower end of the fluidized bed retorting zone of step (d) as the fluidizing and retorting gas therein;
   (l) condensing a substantial portion of the recovered vaporized oil of step (e) and separating the condensed oil from the remaining gas stream;
   (m) mixing a substantial portion of the remaining gas stream of step (l) with air to provide a substantial excess of $O_2$ over stoichiometric; and
   (n) burning the mixed stream of step (m) in step (f) along with oil in the lower section of the gravitating shale to provide at least a substantial portion of said hot retorting gas.

2. The process of claim 1 wherein steam is injected into the retorting zones of steps (d) and (f) as a substantial portion of the retorting gas.

3. The process of claim 1 wherein a substantial portion of the oil shale in the lower section of the retorting zones of steps (d) and (f) is burned to enhance retorting in said zones.

References Cited
UNITED STATES PATENTS

| | | | |
|---|---|---|---|
| 2,480,670 | 8/1949 | Peck | 208—11 |
| 2,725,347 | 11/1955 | Leffer | 208—11 |
| 3,093,571 | 6/1963 | Fish et al. | 208—11 |
| 3,133,010 | 5/1964 | Irish et al. | 208—11 |
| 3,384,569 | 5/1968 | Peet | 208—11 |

HERBERT LEVINE, Primary Examiner

U.S. Cl. X.R.

23—284; 202—113; 208—8